(12) United States Patent
Strunk et al.

(10) Patent No.: US 8,596,681 B1
(45) Date of Patent: Dec. 3, 2013

(54) INTERNAL DEPLOYABLE VEHICLE PANEL ASSEMBLY

(75) Inventors: David Strunk, Royal Oak, MI (US); Darin Evans, Grand Haven, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/483,636

(22) Filed: May 30, 2012

(51) Int. Cl.
*B60R 21/045* (2006.01)

(52) U.S. Cl.
USPC ..... 280/752; 280/753; 280/730.1; 296/37.12; 296/187.05

(58) Field of Classification Search
USPC .......... 280/728.1, 732, 730.1, 748, 752, 753; 296/187.05, 187.06, 187.12, 37.12
IPC ....................................................... B60R 21/045
See application file for complete search history.

(56) References Cited

U.S. PATENT DOCUMENTS

| | | | |
|---|---|---|---|
| 3,096,116 A | 7/1963 | Kost | |
| 5,845,935 A | 12/1998 | Enders et al. | |
| 6,032,978 A | 3/2000 | Spencer et al. | |
| 6,039,380 A * | 3/2000 | Heilig et al. | 296/70 |
| 6,092,836 A | 7/2000 | Saslecov | |
| 6,213,497 B1 | 4/2001 | Spencer et al. | |
| 6,276,713 B1 | 8/2001 | Duletzke | |
| 6,299,209 B1 | 10/2001 | Ankersson et al. | |
| 6,302,437 B1 | 10/2001 | Marriott et al. | |
| 6,338,501 B1 * | 1/2002 | Heilig et al. | 280/753 |
| 6,378,902 B2 * | 4/2002 | Unger et al. | 280/753 |
| 6,471,242 B2 * | 10/2002 | Schneider | 280/732 |
| 6,712,385 B2 | 3/2004 | Enders | |
| 6,758,493 B2 | 7/2004 | Conlee et al. | |
| 6,817,627 B2 * | 11/2004 | Galmiche et al. | 280/730.1 |
| 6,848,715 B2 | 2/2005 | Nelson et al. | |
| 6,874,811 B2 | 4/2005 | Enders et al. | |
| 6,971,667 B2 | 12/2005 | Enders et al. | |
| 6,976,706 B2 * | 12/2005 | Smith et al. | 280/753 |
| 7,182,191 B2 | 2/2007 | Scott et al. | |
| 7,261,318 B2 | 8/2007 | Enders | |
| 7,364,189 B2 | 4/2008 | Morris et al. | |
| 7,367,587 B2 | 5/2008 | Taoka | |
| 7,396,040 B2 | 7/2008 | Enders et al. | |
| 7,810,602 B2 | 10/2010 | Evans | |
| 7,810,877 B2 * | 10/2010 | Ishitobi | 296/193.11 |
| 7,878,532 B2 | 2/2011 | Sasaki et al. | |
| 8,308,189 B2 * | 11/2012 | Matsushima et al. | 280/732 |
| 2002/0121770 A1 * | 9/2002 | Schneider | 280/732 |
| 2004/0007856 A1 * | 1/2004 | Enders et al. | 280/730.1 |
| 2004/0080144 A1 * | 4/2004 | Enders | 280/728.2 |
| 2004/0135353 A1 * | 7/2004 | Enders et al. | 280/730.1 |
| 2004/0155447 A1 * | 8/2004 | Smith et al. | 280/753 |

(Continued)

*Primary Examiner* — Ruth Ilan
(74) *Attorney, Agent, or Firm* — Global IP Counselors, LLP

(57) ABSTRACT

An internal deployable vehicle panel assembly includes an inner panel, an outer panel and a deployable energy absorber. The inner panel includes a first mounting structure that movably couples the inner panel to a vehicle component to move between a closed position to cover an access opening to a vehicle storage compartment and an open position to reveal the access opening. The outer panel includes a second mounting structure that is removably coupled to a third mounting structure of the inner panel. The deployable energy absorber is disposed between the inner and outer panels in an undeployed state. The deployable energy absorber is free from fixed attachment to the outer panel and energizable to a deployed state in which the deployable energy absorber separates the outer panel from the inner panel and displaces the outer panel away from the inner panel.

20 Claims, 5 Drawing Sheets

(56) References Cited

U.S. PATENT DOCUMENTS

| | | |
|---|---|---|
| 2009/0079170 A1 | 3/2009 | Bito et al. |
| 2010/0237592 A1 | 9/2010 | Fukawatase et al. |
| 2010/0276914 A1 | 11/2010 | Matsushima et al. |
| 2010/0326782 A1 | 12/2010 | VandenBerge et al. |
| 2011/0156378 A1 | 6/2011 | Matsushima et al. |
| 2011/0193328 A1 | 8/2011 | Fukawatase |
| 2011/0204603 A1 | 8/2011 | Fukawatase et al. |
| 2011/0241320 A1 | 10/2011 | Matsushima et al. |
| 2011/0260432 A1 | 10/2011 | Matsushima |
| 2011/0272929 A1 | 11/2011 | Fukawatase et al. |

\* cited by examiner

INTERNAL DEPLOYABLE VEHICLE PANEL ASSEMBLY

BACKGROUND

1. Field of the Invention

The present invention generally relates to an internal deployable vehicle panel assembly. More specifically, the present invention relates to an internal deployable vehicle panel assembly configured as a deployable glove box door knee bolster assembly.

2. Background Information

Vehicles are often equipped with various devices for protecting occupants during an impact event. For example, vehicles often include front and side airbags which are designed to deploy during an impact event to absorb energy and limit movement of the occupants that occurs due to rapid deceleration of the vehicle. Some vehicles can also include a deployable knee bolster assembly which limits the forward movement of the knees of a passenger during an impact event in order to further absorb energy. However, such assemblies are typically difficult to service without having to replace the entire knee bolster assembly.

In view of the above, it will be apparent to those skilled in the art from this disclosure that there exists a need for an improved deployable knee bolster assembly. This invention addresses this need in the art as well as other needs, which will become apparent to those skilled in the art from this disclosure.

SUMMARY

Accordingly, in view of the state of the known technology, one aspect of the present invention is to provide an internal deployable vehicle panel assembly comprising an inner panel, an outer panel and a deployable energy absorber. The inner panel includes a first mounting structure that movably couples the inner panel to a vehicle component to move between a closed position to cover an access opening to a vehicle storage compartment and an open position to reveal the access opening. The outer panel includes a second mounting structure that is removably coupled to a third mounting structure of the inner panel. The deployable energy absorber is disposed between the inner and outer panels in an undeployed state. The deployable energy absorber is free from fixed attachment to the outer panel and energizable to a deployed state in which the deployable energy absorber separates the outer panel from the inner panel and displaces the outer panel away from the inner panel.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
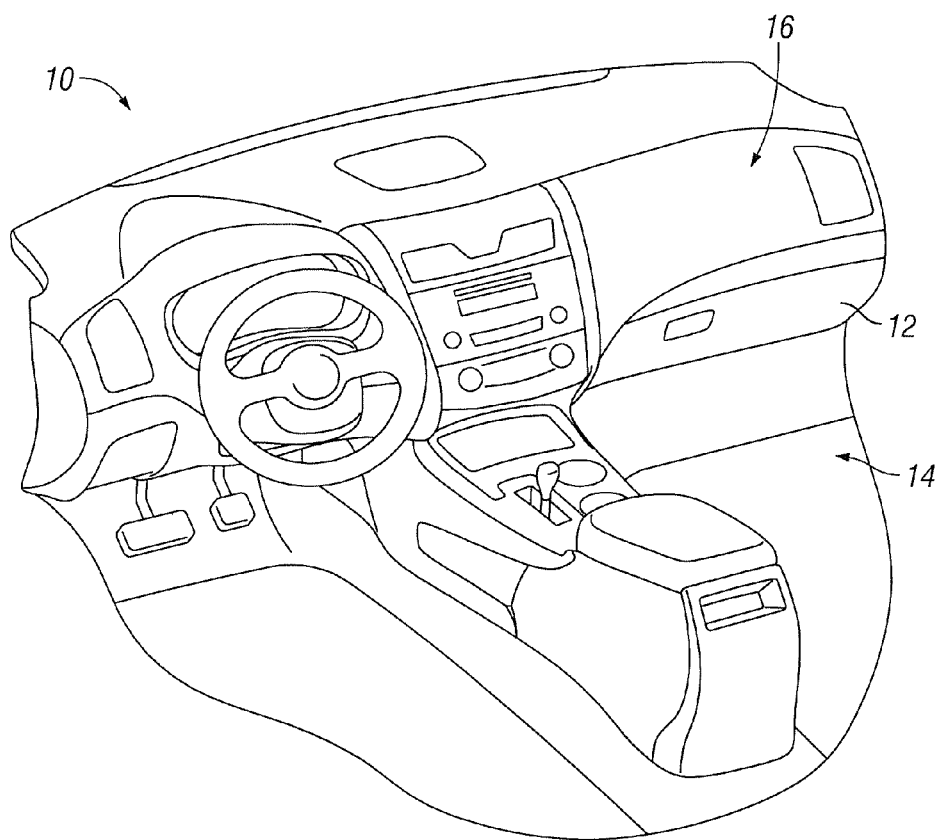
FIG. 1 is a front perspective view of a vehicle equipped with an internal deployable vehicle panel assembly configured as a deployable glove box door knee bolster assembly according to a disclosed embodiment.
Figure 2:
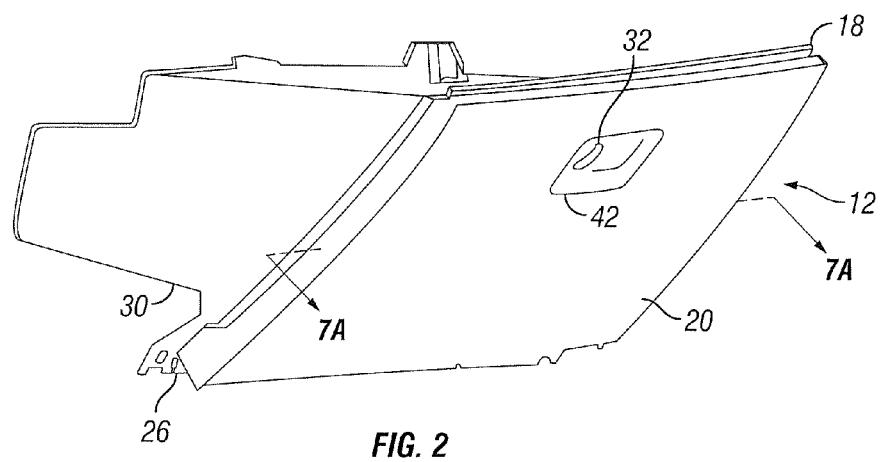
FIG. 2 is a perspective view of the internal deployable vehicle panel assembly removed from the vehicle.

Referring initially to FIGS. 1 and 2, an automotive vehicle 10 is illustrated with an internal deployable vehicle panel assembly 12 in accordance with one embodiment. The vehicle 10 can be, for example, an SUV, an automobile, a truck, a van or any other suitable vehicle. The vehicle 10 is conventional, except for the internal deployable vehicle panel assembly 12 as described herein. Accordingly, the vehicle 10 and its various parts will not be discussed and/or illustrated in detail herein, except as related to the internal deployable vehicle panel assembly 12.

As illustrated, the vehicle 10 includes a passenger compartment 14 having a dashboard or instrument panel 16. In this example, the internal deployable vehicle panel assembly 12 is configured as a glove box (or vehicle storage compartment) in the instrument panel 16.

As further shown in FIGS. 2-5, the internal deployable vehicle panel assembly 12 includes an inner panel 18, an outer panel 20 and a deployable energy absorber 22. The inner and outer panels 18 and 20 can be made of plastic, composites or any other suitable material as understood in the art. The inner panel 18 includes a first mounting structure 24 that movably couples the inner panel 18 to a vehicle component 26 to move between a closed position to cover an access opening 28 to a vehicle storage compartment 30 and an open position to reveal the access opening 28. For instance, the first mounting structure 24 can include a hinge arrangement that hingedly couples the inner panel 18 to the instrument panel 16. In this example, the vehicle storage compartment 30 is configured as a vehicle glove box. Thus, the first mounting structure 24 pivotally couples the inner panel 18 to the vehicle component 26 such that the inner panel 18 covers the access opening 28 of the vehicle glove box while the inner panel 18 is in the closed position. The inner panel 18 further includes a latching device 32 which releasably latches the inner panel 18 to the vehicle component 26 while the inner panel 18 is in the closed position. The latching device 32 can be any suitable latching device, such as a typical glove box latching device as known in the art.

The outer panel 20 has a second mounting structure 34 that is removably coupled to a third mounting structure 36 of the inner panel 18. For example, the outer panel 20 can include an edge 34 (second mounting structure) that snap fits with an edge 36 (third mounting structure) of the inner panel 18 to removably couple the outer panel 20 to the inner panel 18. In addition, the internal deployable vehicle panel assembly 12 can include a plurality of retention clips 38 that removably couple the outer panel 20 to the inner panel 18 as understood in the art. The retention clips 38 can be made of metal, plastic, composites or any other suitable types of material. Also, the internal deployable vehicle panel assembly 12 can include one or more adhesive components 40, such as two-sided adhesive tape, which removably couple the outer panel 20 to the deployable energy absorber 22. Accordingly, the outer panel 20 is sufficiently secured to the inner panel 18 during normal operation but can separate from the inner panel 18 in a predictable manner without damaging the components of the internal deployable vehicle panel assembly 12 when the deployable energy absorber 22 is deployed. Furthermore, the outer panel 20 includes an opening 42 which permits access to the latching device 32 and further enables the outer panel 20 to separate from the inner panel 18 without contacting the latching device 32 as discussed in more detail below.

Figure 3:
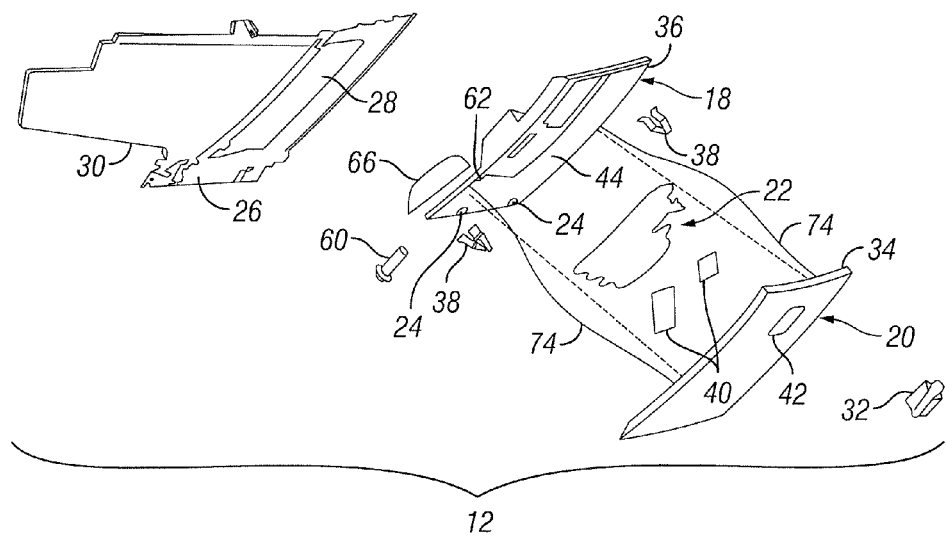
FIG. 3 is an exploded perspective view of the internal deployable vehicle panel assembly.
Figure 4:
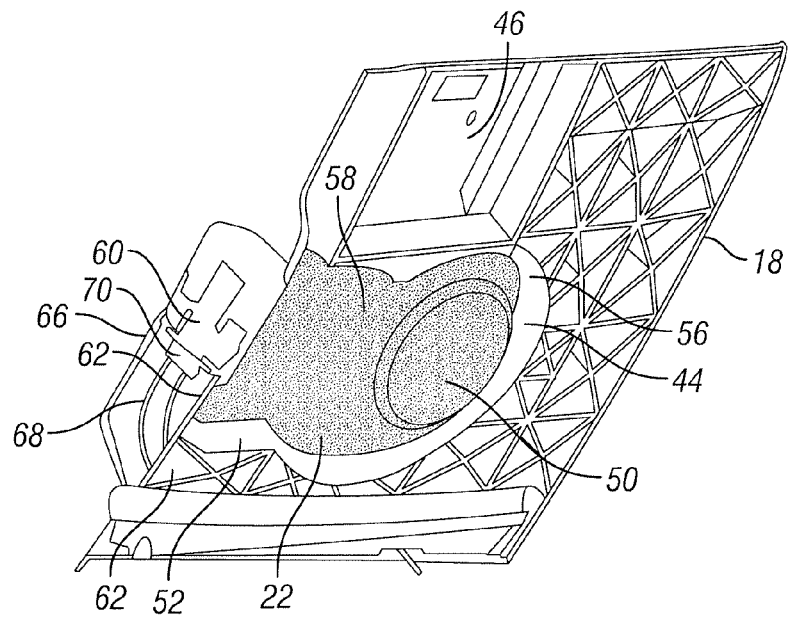
FIG. 4 is a cutaway perspective view of the inner panel and deployable energy absorber of the internal deployable vehicle panel assembly.
Figure 5:
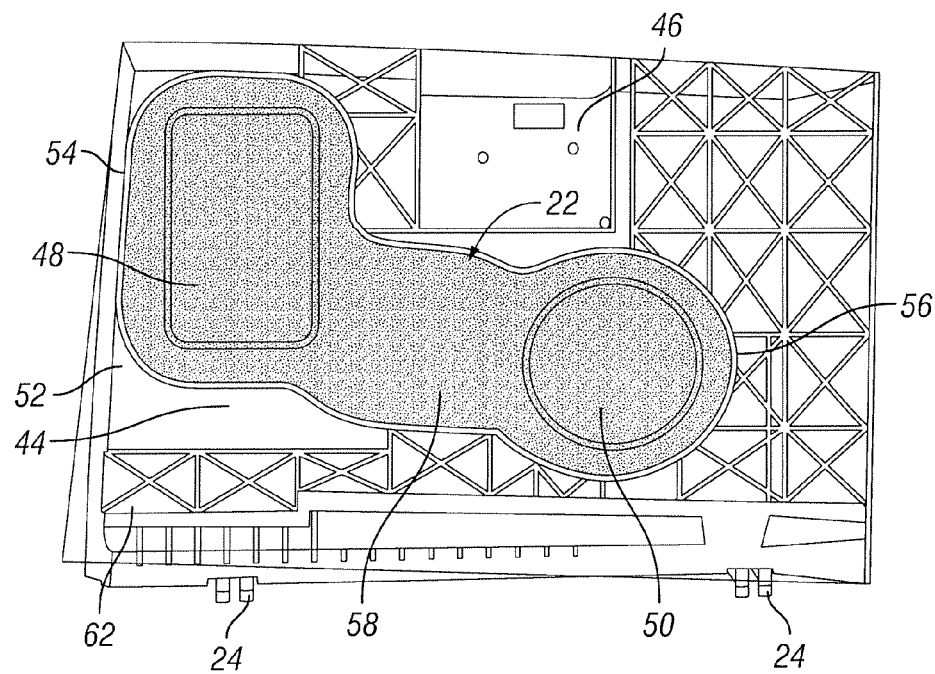
FIG. 5 is a front elevational view of the inner panel and deployable energy absorber of the internal deployable vehicle panel assembly.

As further illustrated, the deployable energy absorber 22 is disposed between the inner and outer panels 18 and 20 in an undeployed state. In particular, the deployable energy absorber 22 can be a deployable thermoplastic energy absorber as understood in the art. The deployable energy absorber 22 is attached to the inner panel 18 and is free from fixed attachment to the outer panel 20. For example, the deployable energy absorber 22 can be welded to the inner surface 44 of the inner panel 18 to create a hermetically sealed chamber that is accessible through the inner panel 18 as shown in FIGS. 3 and 4 in particular.

Also, the deployable energy absorber 22 is positioned between the inner and outer panels 18 and 20 to avoid interference with the latching device 32. In other words, as shown in FIGS. 3 and 4, the deployable energy absorber 22 is positioned about a perimeter of the latching device area 46 of the inner panel 18. The deployable energy absorber 22 further includes a first section 48 and a second section 50 having a different shape than the first section 48. The first section 48 is laterally spaced further from a center of the inner panel 18 than the second section 50. More specifically, the first section 48 is disposed at a first location 52, which is closer to an inner edge 54 of the inner panel 18 than a second location 56 at which the second section 50 is disposed. The deployable energy absorber further includes a third section 58 that couples the first and second sections 48 and 50 together to form a contiguous inflatable volume. In this example, the first section 48 has a rectangular cross-section and the second section 50 has a circular cross-section in a plane that extends between and parallel to the inner and outer panels 18 and 20, respectively. However, the first section 48, the second section 50 and the third section 58 can have any suitable shape so that the deployable energy absorber 22 can be accommodated between the inner and outer panels 18 and 20. Furthermore, the first and second sections 48 and 50 can be shaped so as to contact the knees of an occupant in a desired manner.

The internal deployable vehicle panel assembly 12 further includes an energizing device 60 which energizes the deployable energy absorber 22 as discussed in more detail below. The energizing device 60 can be a pyrotechnic inflation device, such as a micro gas generator as known in the art. The energizing device 60 can inflate the deployable energy absorber 22 to, for example, up to five times the undeployed sized of the deployable energy absorber 22. Naturally, the energizing device 60 and deployable energy absorber 22 can be configured such that the deployable energy absorber 22 inflates to any suitable size which can be any suitable multiple of the original undeployed size.

In this example, the energizing device 60 is disposed at a first side 62 of the inner panel 18 opposite to a second side 64 of the inner panel 18 which faces the outer panel 20 while the outer panel 20 is coupled to the inner panel 18. The internal deployable vehicle panel assembly 12 also includes a removable cover 66 that is removably coupled to the first side 62 of the inner panel 18 and covers the energizing device 60. The cover 66 can be made of plastic, composites, metal or any other suitable material. The cover 66 can be transparent or can have an isolated window or transparent area through which the energizing device 60 can be viewed. The cover 66 can be snap fit to the first side 62 of the inner panel 18, or can be coupled to the inner panel 18 with removable pins or any other suitable type of fasteners. In addition, one or more wiring harnesses 68 can be coupled to the energizing device 60 to enable the energizing device 60 to, for example, receive power and communicate with a controller (not shown) via the wiring harness 68. In this arrangement, the removable cover 66 is positioned to cover the cable 68 and the energizing device 60. Therefore, the cover 66 protects the wiring harness 68 and the energizing device 60 from contact with the contents of the vehicle storage compartment 30. Also, the energizing device 60 can be easily replaced from the first side 62 of the inner panel 18 when the inner panel 18 is in the open position. As such, the entire internal deployable vehicle panel assembly 12 needs not be replaced to service or replace the energizing device 60 or its associated components, such as the cable 68 or a connector 70 which couples the cable 68 to the energizing device 60.

Figure 6:
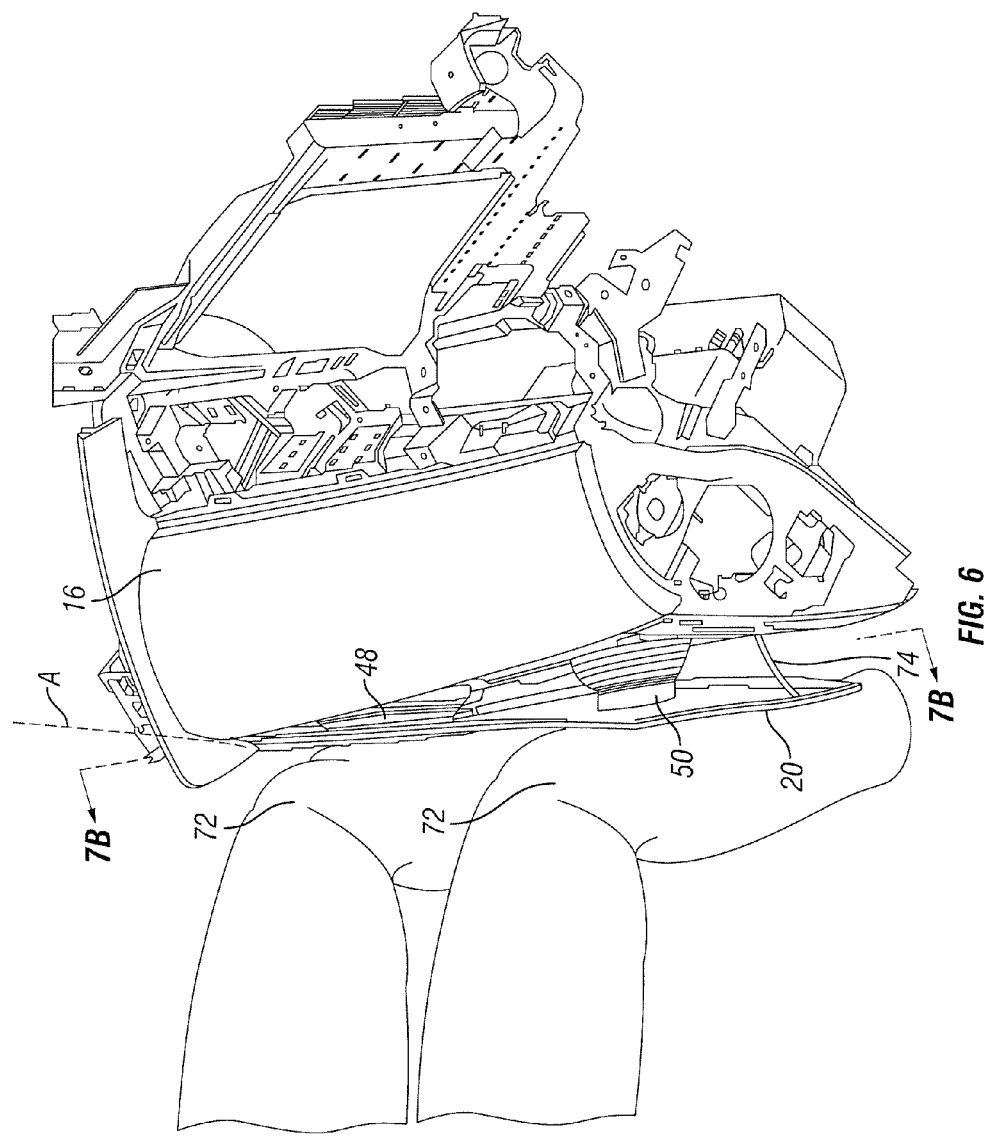
FIG. 6 is a perspective view illustrating an example of the deployable energy absorber of the internal deployable vehicle panel assembly in a deployed state.
Figure 7A:
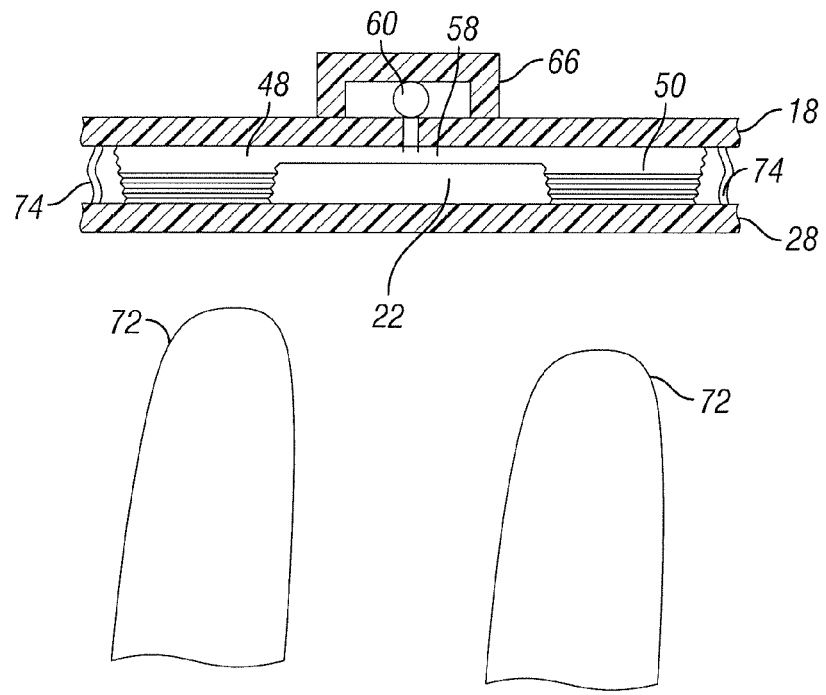
FIG. 7A is a cross-sectional view illustrating an example of the deployable energy absorber of the internal deployable vehicle panel assembly in an undeployed state taken along line 7A-7A in FIG. 2.
Figure 7B:
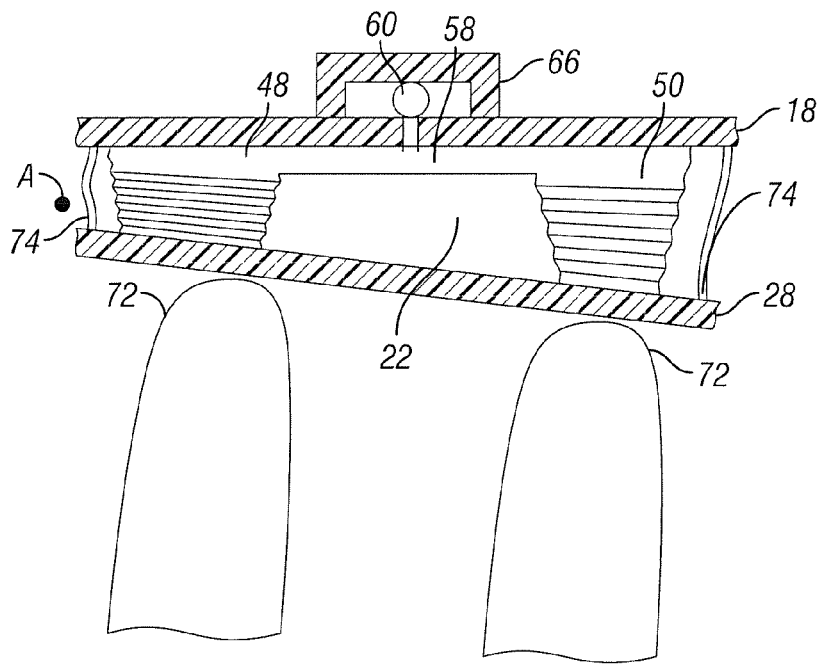
FIG. 7B is a cross-sectional view illustrating an example of the deployable energy absorber of the internal deployable vehicle panel assembly in a deployed state taken along line 7B-7B in FIG. 6.

As shown in more detail in FIGS. 6, 7A and 7B, the deployable energy absorber 22 is energizable to a deployed state in which the deployable energy absorber 22 separates the outer panel 20 from the inner panel 18 and displaces the outer panel 22 away from the inner panel 18. That is, when the deployable energy absorber 22 is in an undeployed state as shown, for example, in FIGS. 2 and 7A and an impact event is detected, the controller (not shown) can send a signal to the energizing device 60 to energize (i.e., inflate) the deployable energy absorber 22 to a deployed state in which the deployable energy absorber 22 extends outwardly from the inner panel 18 as shown in FIGS. 6 and 7B. In this example, the second section 50 of the deployable energy absorber 22 is configured to fully expand faster than the first section 48 while the deployable energy absorber 22 is energized to the deployed state. That is, the first and second sections 48 and 50 (first and second expandable portions) and the third section 58 (connecting portion) collectively define a contiguous inflatable volume. Thus, when the deployable energy absorber 22 is energized to the deployed state, the first and second expandable portions 48 and 50 extend outwardly from the inner panel 18. In particular, the second expandable portion 50 extends further outward from the inner panel 18 than the first expandable portion 48 when the deployable energy absorber 22 is energized.

Accordingly, the deployable energy absorber 22 is configured to separate the outer panel 20 from the inner panel 18 such that the outer panel 20 at least partially rotates about an axis A extending along the inner edge 54 of the inner panel 18 while the deployable energy absorber 22 is energized to the deployed state. Therefore, the deployable energy absorber 22 drives the outer panel 20 toward the knees 72 of a passenger when the deployable energy absorber 22 is energized. This initial deployment of the deployable energy absorber 22 and the subsequent inflation absorbs forward kinetic energy at or about the knees 72 of the passenger to reduce forward travel of the passenger. By fully expanding faster than the first section 48, the second section 50 can position the outer panel 20 squarely with the knees 72 of the passenger when the passenger does not sit facing a direction that is exactly perpendicular to the instrument panel assembly 12 (i.e., when the instrument panel assembly 12 includes one or more angles or contours in a cross-car direction).

As further shown, the internal deployable vehicle panel assembly 12 can include one or more tethers 74 which retain the outer panel 20 at a desired distance from the inner panel 18 after the deployable energy absorber separates the outer panel 20 from the inner panel 18. The tethers 74 can be made of a nylon material similar to that which is used for automobile airbags, a thermoplastic material, or any other suitable type of material. Thus, the tethers 74 further enable the outer panel 20 to become separated from the inner panel 18 in a controlled manner when the deployable energy absorber 22 is deployed (i.e., prevent the outer panel 20 from becoming a projectile within the passenger compartment 14).

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "outboard", inboard", "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention. The terms of degree such as "generally", "substantially", "about" and "approximately" as used herein mean a reasonable amount of deviation of the modified term such that the end result is not significantly changed. For example, two members that are angled less than ten degrees apart would be considered "generally perpendicular", but two members that are angled more than fifteen degrees apart would not be considered "generally perpendicular".

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. An internal deployable vehicle panel assembly comprising:
   an inner panel having a first mounting structure that movably couples the inner panel to a vehicle component to move between a closed position to cover an access opening to a vehicle storage compartment and an open position to reveal the access opening;
   an outer panel having a second mounting structure that is removably coupled to a third mounting structure of the inner panel; and
   a deployable energy absorber disposed between the inner and outer panels in an undeployed state, the deployable energy absorber being free from fixed attachment to the outer panel and being energizable to a deployed state in which the deployable energy absorber separates the outer panel from the inner panel and displaces the outer panel away from the inner panel, the deployable energy absorber including a first section, a second section having a different shape than the first section, and a third section that couples the first and second sections together to form a contiguous inflatable volume.

2. The internal deployable vehicle panel assembly according to claim 1, further comprising
   a tether which retains the outer panel at a distance from the inner panel after the deployable energy absorber separates the outer panel from the inner panel.

3. The internal deployable vehicle panel assembly according to claim 1, further comprising
   an energizing device disposed at a first side of the inner panel opposite to a second side of the inner panel which faces the outer panel while the outer panel is coupled to the inner panel.

4. The internal deployable vehicle panel assembly according to claim 3, further comprising
   a removable cover removably coupled to the first side of the inner panel and covering the energizing device.

5. The internal deployable vehicle panel assembly according to claim 4, further comprising
   a wiring harness coupled to the energizing device, with the removable cover covering the wiring harness and the energizing device.

6. The internal deployable vehicle panel assembly according to claim 1, further comprising
   at least one retention clip removably coupling the outer panel to the inner panel.

7. The internal deployable vehicle panel assembly according to claim 1, further comprising
   an adhesive component removably coupling the outer panel to the deployable energy absorber.

8. The internal deployable vehicle panel assembly according to claim 1, further comprising
   a latching device fixed to the inner panel which releasably latches the inner panel to the vehicle component while the inner panel is in the closed position; and
   the deployable energy absorber is positioned between the inner and outer panels to avoid interference with the latching device.

9. The internal deployable vehicle panel assembly according to claim 8, wherein the outer panel includes an opening which permits access to the latching device and further enables the outer panel to separate from the inner panel without contacting the latching device.

10. The internal deployable vehicle panel assembly according to claim 1, wherein
the vehicle storage compartment is configured as a vehicle glove box, and the mounting structure pivotally couples the inner panel to the vehicle component such that the inner panel covers the access opening of the vehicle glove box while the inner panel is in the closed position.

11. An internal deployable vehicle panel assembly comprising:
an inner panel having a mounting structure that movably couples the inner panel to a vehicle component to move between a closed position to cover an access opening to a vehicle storage compartment and an open position to reveal the access opening;
an outer panel removeably coupled to the inner panel;
a deployable energy absorber disposed between the inner and outer panels in an undeployed state, and being energizable to a deployed state in which the deployable energy absorber extends outwardly from the inner panel;
an energizing device disposed at a first side of the inner panel opposite to a second side of the inner panel which faces the outer panel while the outer panel is coupled to the inner panel;
a removable cover removably coupled to the inner panel and covering the energizing device; and
a wiring harness coupled to the energizing device, with the removable cover covering the wiring harness and the energizing device.

12. The internal deployable vehicle panel assembly according to claim 11, wherein
the deployable energy absorber includes a first section and a second section having a different shape than the first section.

13. The internal deployable vehicle panel assembly according to claim 12, wherein
the first section is laterally spaced further from a center of the inner panel than the second section.

14. The internal deployable vehicle panel assembly according to claim 12, wherein
the second section is configured to fully expand faster than the first section while the deployable energy absorber is energized to the deployed state.

15. The internal deployable vehicle panel assembly according to claim 12, wherein
the deployable energy absorber includes a third section that couples the first and second sections together to form a contiguous inflatable volume.

16. The internal deployable vehicle panel assembly according to claim 12, wherein
the first section has a rectangular cross-section and the second section has a circular cross-section in a plane that extends between and parallel to the inner and outer panels.

17. An internal deployable vehicle panel assembly comprising:
an inner panel having a first mounting structure that movably couples the inner panel to a vehicle component to move between a closed position to cover an access opening to a vehicle storage compartment and an open position to reveal the access opening;
an outer panel having a second mounting structure that is removably coupled to a third mounting structure of the inner panel; and
a deployable energy absorber disposed between the inner and outer panels in an undeployed state, the deployable energy absorber being free from fixed attachment to the outer panel and being energizable to a deployed state in which the deployable energy absorber separates the outer panel from the inner panel and displaces the outer panel away from the inner panel such that the outer panel at least partially rotates about an axis extending along a lateral edge of the inner panel while the deployable energy absorber is energized to the deployed state.

18. An internal deployable vehicle panel assembly comprising:
an inner panel having a mounting structure that movably couples the inner panel to a vehicle component to move between a closed position to cover an access opening to a vehicle storage compartment and an open position to reveal the access opening;
an outer panel removeably coupled to the inner panel; and
a deployable energy absorber disposed between the inner and outer panels in an undeployed state and including first and second expandable portions spaced apart by a connecting portion, with the first and second expandable portions and the connecting portion collectively defining a contiguous inflatable volume, the deployable energy absorber being energizable to a deployed state in which the first and second expandable portions extend outwardly from the inner panel, and the second expandable portion being configured to extend further outward from the inner panel than the first expandable portion when the deployable energy absorber is energized.

19. The internal deployable vehicle panel assembly according to claim 18, further comprising
an energizing device disposed at a first side of the inner panel opposite to a second side of the inner panel which faces the outer panel while the outer panel is coupled to the inner panel;
a removable cover removably coupled to the first side of the inner panel and covering the energizing device; and
a wiring harness coupled to the energizing device, with the removable cover covering the wiring harness and the energizing device.

20. The internal deployable vehicle panel assembly according to claim 18, wherein
the first section has a rectangular cross-section and the second section has a circular cross-section in a plane that extends between and parallel to the inner and outer panels.

* * * * *